United States Patent
Bergen et al.

(10) Patent No.: US 7,590,683 B2
(45) Date of Patent: Sep. 15, 2009

(54) RESTARTING PROCESSES IN DISTRIBUTED APPLICATIONS ON BLADE SERVERS

(75) Inventors: Axel Von Bergen, Wiesloch (DE);
Volker Sauermann, Heidelberg (DE);
Arne Schwarz, Heidelberg (DE);
Wolfgang Becker, Ludwigshafen (DE);
Guenter Zachmann, Rauenberg (DE)

(73) Assignee: SAP AG, Walldorf (DE)

( * ) Notice: Subject to any disclaimer, the term of this patent is extended or adjusted under 35 U.S.C. 154(b) by 999 days.

(21) Appl. No.: 10/418,305

(22) Filed: Apr. 18, 2003

(65) Prior Publication Data
US 2004/0210898 A1    Oct. 21, 2004

(51) Int. Cl.
*G06F 15/16* (2006.01)
(52) U.S. Cl. .................................. 709/203
(58) Field of Classification Search ........... 709/203
See application file for complete search history.

(56) References Cited

U.S. PATENT DOCUMENTS

| | | | |
|---|---|---|---|
| 4,823,256 A * | 4/1989 | Bishop et al. ............... 714/10 |
| 5,551,047 A * | 8/1996 | Mori et al. .................. 712/28 |
| 5,742,829 A | 4/1998 | Davis et al. |
| 5,974,566 A * | 10/1999 | Ault et al. ................... 714/15 |
| 6,101,327 A | 8/2000 | Holte-Rost et al. |
| 6,195,616 B1 | 2/2001 | Reed et al. |
| 6,202,207 B1 | 3/2001 | Donohue |
| 6,263,387 B1 | 7/2001 | Chrabaszcz |
| 6,345,266 B1 * | 2/2002 | Ganguly et al. ............. 707/1 |
| 6,453,426 B1 | 9/2002 | Gamache et al. |
| 6,625,750 B1 * | 9/2003 | Duso et al. ................. 714/11 |
| 6,654,801 B2 * | 11/2003 | Mann et al. ................ 709/224 |
| 6,728,747 B1 * | 4/2004 | Jenkins et al. ............. 718/101 |
| 6,970,902 B1 * | 11/2005 | Moon ....................... 709/201 |
| 6,985,937 B1 | 1/2006 | Keshav et al. |
| 7,143,420 B2 * | 11/2006 | Radhakrishnan ............ 719/328 |
| 7,315,903 B1 | 1/2008 | Bowden |
| 2002/0095487 A1 * | 7/2002 | Day et al. .................. 709/223 |
| 2002/0133537 A1 | 9/2002 | Lau et al. |
| 2003/0046394 A1 | 3/2003 | Goddard et al. |
| 2003/0101304 A1 | 5/2003 | King et al. |
| 2003/0105904 A1 | 6/2003 | Abbondanzio et al. |
| 2003/0140267 A1 | 7/2003 | Abbondanzio et al. |

(Continued)

FOREIGN PATENT DOCUMENTS

EP    1 037 133    9/2000

(Continued)

OTHER PUBLICATIONS

Dejan et al., "Process Migration", Sep. 2000, ACM Computing survey (CSUR), vol. 32, Issue 3, p. 241-299.

(Continued)

*Primary Examiner*—Dohm Chankong
*Assistant Examiner*—Brian P Whipple
(74) *Attorney, Agent, or Firm*—Finnegan, Henderson, Farabow, Garrett & Dunner, LLP

(57) ABSTRACT

A method for restarting a process running on a first processor includes preparing a second processor, copying process context information to the second processor, starting a second process using the context information on the second processor, and terminating a first process running on the first processor. The second process performs an equivalent function to the first process.

12 Claims, 13 Drawing Sheets

U.S. PATENT DOCUMENTS

| | | | |
|---|---|---|---|
| 2003/0154236 A1* | 8/2003 | Dar et al. | 709/201 |
| 2004/0015581 A1 | 1/2004 | Forbes | |
| 2004/0024831 A1* | 2/2004 | Yang et al. | 709/208 |
| 2004/0047286 A1 | 3/2004 | Larsen et al. | |
| 2004/0054712 A1 | 3/2004 | Andreev et al. | |
| 2004/0078621 A1 | 4/2004 | Talaugon et al. | |
| 2004/0088414 A1 | 5/2004 | Flynn et al. | |
| 2004/0128442 A1* | 7/2004 | Hinshaw et al. | 711/114 |
| 2004/0153697 A1 | 8/2004 | Chang et al. | |
| 2004/0210887 A1 | 10/2004 | Von Bergen et al. | |
| 2004/0210888 A1 | 10/2004 | Von Bergen et al. | |
| 2004/0210898 A1 | 10/2004 | Bergen et al. | |
| 2004/0255191 A1 | 12/2004 | Fox et al. | |
| 2005/0033806 A1* | 2/2005 | Harvey et al. | 709/204 |
| 2005/0246436 A1* | 11/2005 | Day et al. | 709/223 |
| 2007/0083861 A1 | 4/2007 | Becker et al. | |
| 2007/0088768 A1 | 4/2007 | Passerini et al. | |

FOREIGN PATENT DOCUMENTS

| | | |
|---|---|---|
| WO | WO 94/09585 | 4/1994 |
| WO | WO 02/061612 A2 | 8/2002 |
| WO | WO 02/061613 A3 | 8/2002 |
| WO | WO 03/005192 | 1/2003 |

OTHER PUBLICATIONS

Constantine P. Sapuntzakis, Ramesh Chandra, Ben Pfaff, Jim Chow, Monica S. Lam, Mendel Rosenblum, "Migration: Optimizing the migration of virtual computers", Dec. 2002, ACM SIGOPS Operating Systems Review, vol. 36, Issue SI-retrieved Dec. 21, 2006.

U.S. Appl. No. 10/418,308, filed Apr. 18, 2003, entitled "Upgrading Software on Blade Servers.".

U.S. Appl. No. 10/418,307 filed Apr. 10, 2003 entitled "Testing Software on Blade Servers.".

"Data Migration," retrieved from http://en.wikipedia.org/wiki/Data_Migration on Feb. 19, 2008.

* cited by examiner

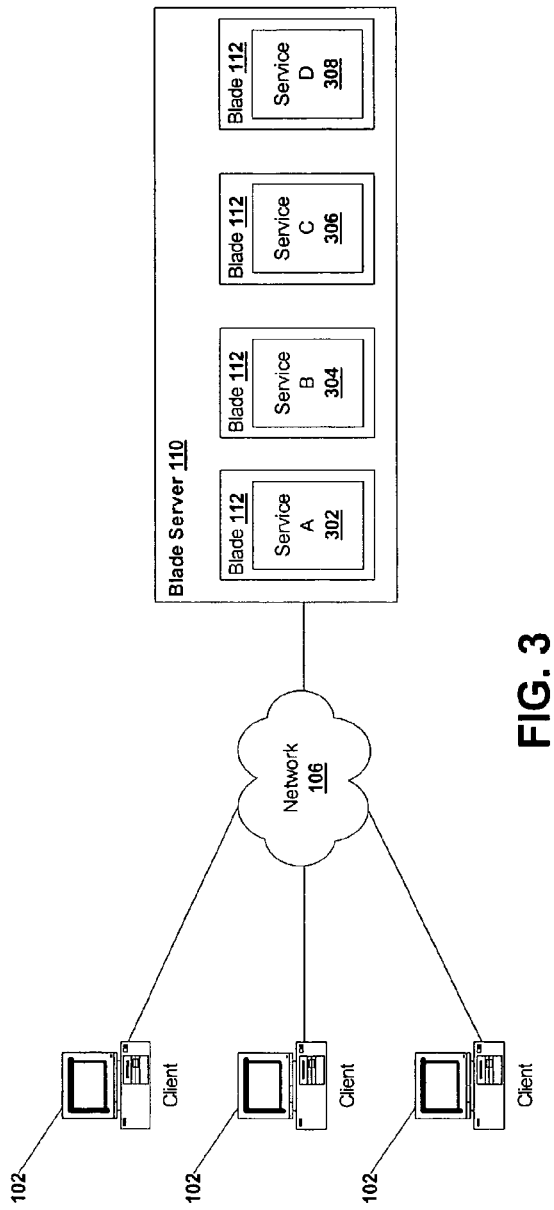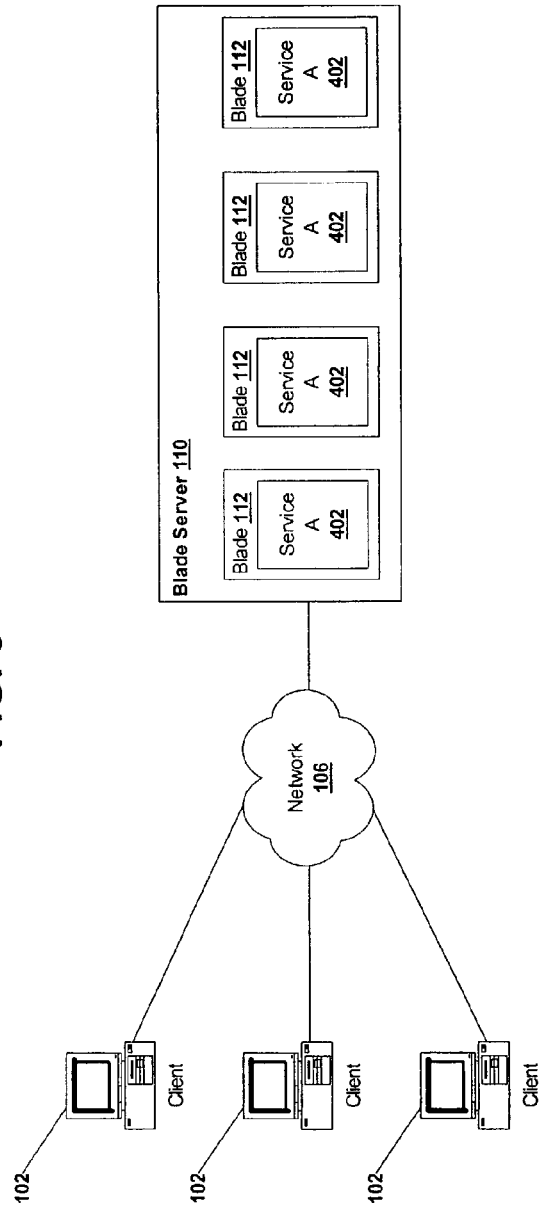

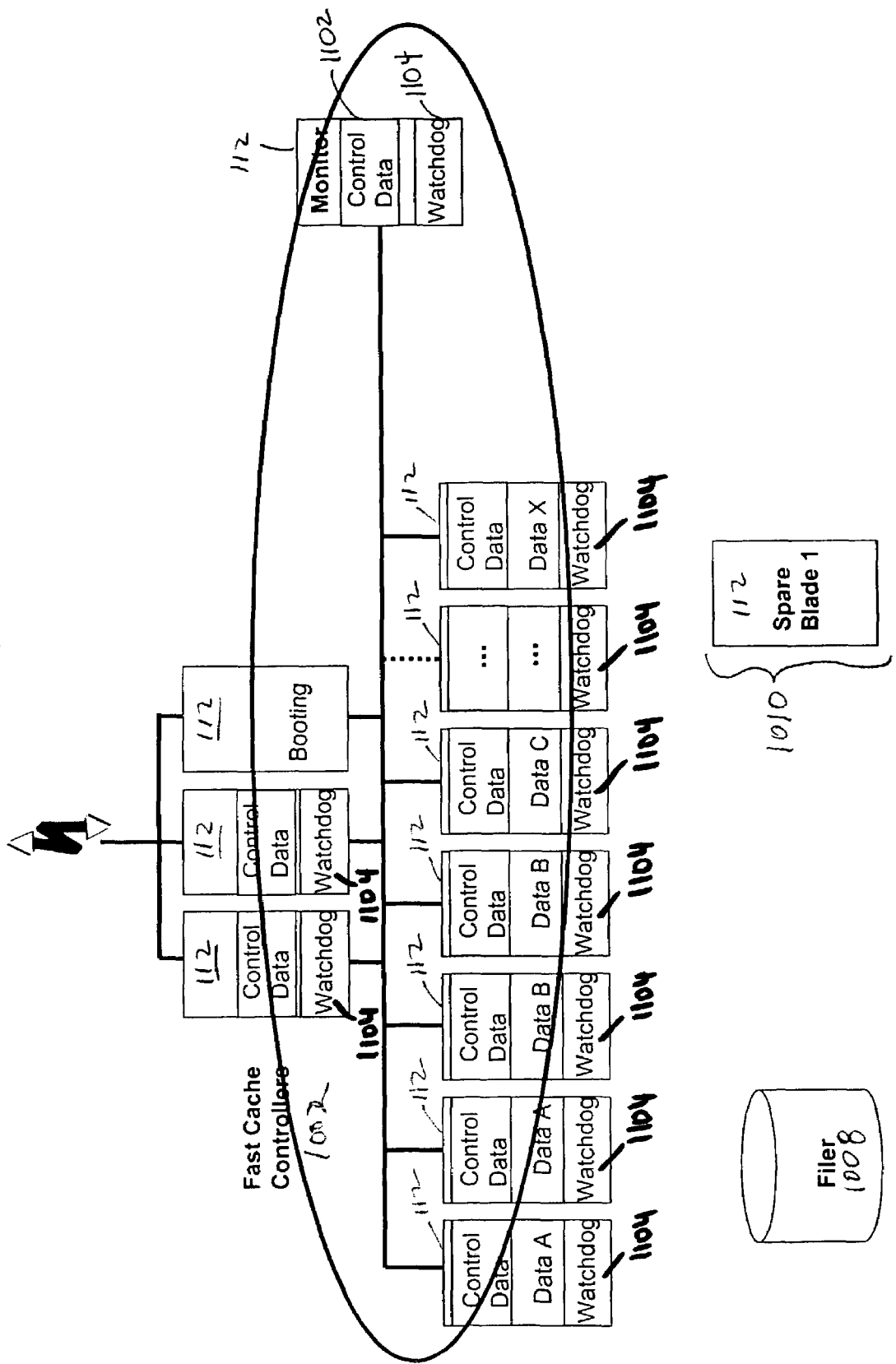

RESTARTING PROCESSES IN DISTRIBUTED APPLICATIONS ON BLADE SERVERS

RELATED APPLICATIONS

This application is related to the following co-pending applications, each of which is being filed concurrently with this application: (1) U.S. application Ser. No. 10/418,308, titled "Upgrading Software on Blade Servers;" and (2) U.S. application Ser. No. 10/418,307, titled "Testing Software on Blade Servers."

TECHNICAL FIELD

This disclosure is directed to a technique for restarting processes in distributed applications on blade servers.

BACKGROUND

Business applications (e.g., customer relationship management systems, product lifecycle management systems, or supply chain management systems) may be used to facilitate the management and implementation of complex business processes. As the volume of data and computational complexity of business applications increase, faster, more capable business application servers may be used to meet performance requirements.

One technique that is used to improve system performance of a business application is to upgrade to a server having greater processing power, increased data throughput, more memory, and additional data storage space. For example, the performance of a typical business application may be improved by purchasing a new server having faster processors, and greater main memory.

Another technique that is sometimes used to increase the performance of a system is to breakdown the complexity of the system into components that may be distributed. For example, web server architectures were largely monolithic in nature with a single server used to support many different tasks and, perhaps, many different websites. As the performance demands of websites increased and as the web hosting market grew, the industry trend tended towards breaking the functionality of a website into smaller components that may be run on smaller, less-capable, cheaper servers.

The market met the demand for smaller, inexpensive servers by offering rack-mounted systems complete with one or more processors, main memory, and a harddrive. These rack-mounted systems allow a web-hosting company to provide independent systems to their customers in a configuration that minimizes the needed floor space in the hosting company's facilities.

Rack-mounted servers may substantially increase the number of systems that may be stored in a single rack; however, each system typically is completely independent of the other systems. One technique that has recently been used to further increase the number of systems that may be stored in a single rack is to share some resources, such as power supplies, between multiple systems. For example, a unit, called a blade server, may include one or more power supplies, one or more network interfaces, and slots for one or more small servers built on cards that may be plugged into the blade server. One commercial example of a blade servers is the Dell PowerEdge 1655MC.

SUMMARY

In one general aspect, a method for restarting a process running on a first processor includes preparing a second processor, copying process context information to the second processor, starting a second process using the context information on the second processor, and terminating a first process running on the first processor. The second process performs an equivalent function to the first process.

In some implementations, the first processor is associated with a first blade in a blade server and the second processor is associated with a second blade in a blade server. The blade of the first processor and the blade of the second processor may be located in different blade servers.

Preparing the second processor may include installing an operating system and installing application software. Some configuration of the operating system and the application software may be performed to prepare the second processor to run the restarted process. The second process may be activated from cold reserve, warm reserve, or hot reserve.

In some implementations, copying process context information to the second processor includes copying control data or process data to the second processor. The process data may include dynamic data that is copied by creating a checkpoint of the dynamic data, and copying the checkpointed data to the second processor.

To activate the restarted process, the system may notify a controller that the second process is active and notify the controller that the first process is inactive. Then, the first process may be terminated. This process restart technique may be used in any application such as, for example, a fast cache system or a data store system.

In another general aspect, a blade system includes a first blade executing a process that provides a service, a second blade, and a controller. The blade system is operable to restart the process on the second blade such that the service is available while the process is restarted. The first blade and the second blade may be located on different blade servers. The blade system may periodically restart the process.

In some implementations, the controller manages multiple processes by receiving a client request and forwarding the client request to one or more of the multiple processes to satisfy the request. The controller may forward the client request to the process if the client request is for the service. The process may be restarted by starting a new process to provide the service and by configuring the controller to forward the client request to the new process if the client request is for the service.

The details of one or more implementations are set forth in the accompanying drawings and the description below. Other features will be apparent from the description and drawings, and from the claims.

DESCRIPTION OF DRAWINGS

FIG. 3 is a network diagram of a blade server with multiple services distributed across the blades.

FIG. 4 is a network diagram of a blade server with a service distributed across multiple blades.

FIG. 15 is a diagram of a system using a single booting blade to periodically restart multiple blade classes.

DETAILED DESCRIPTION

Rack-mounted servers and blade servers provide cost-effective hardware architectures in a configuration that maximizes computer room floor space utilization. These servers typically are used to support independent applications, such as, for example, web servers, email servers, or databases. Large business applications typically have performance requirements that exceed the capabilities of small, rack-mounted servers. It is desirable to provide techniques that may be used to distribute services, such as a business applications, across multiple rack-mounted servers and/or multiple server blades.

Figure 1:
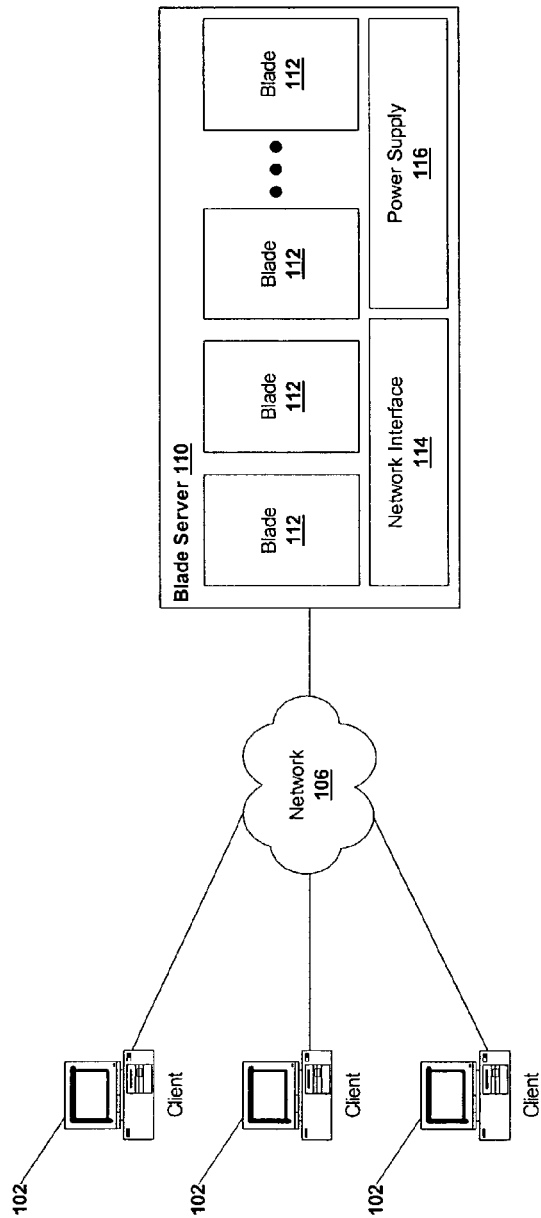
FIG. 1 is a network diagram of a system using a blade server to provide a service to one or more clients.

Referring to FIG. 1, one or more clients 102 connect across a network 106 to a blade server 110 that hosts one or more server applications. The client 102 may include any device operable to access a server across a network, such as, for example, a personal computer, a laptop computer, a personal digital assistant (PDA), a mobile phone, or any similar device. The client 102 includes a network interface to access network 106 which provides a communications link to the blade server 110. Network 106 may use any network technology such as, for example, a local area network, a wireless network, a wide area network, and/or the Internet.

The blade server 110 includes multiple slots to receive one or more computer systems, called blades 112. The blade server 110 also provides a network interface 114 and a power supply 116 for use by the blades 112. To increase system availability, some implementations provide redundancy to reduce the likelihood of system outage due to component failure. For example, a blade server 110 may include multiple network interfaces 114 such that when one network interface 114 fails, the system can fall-over to a backup network interface 114. Similarly, the blade server 110 may include two or more power supplies to prevent system outage due to failure of one power supply.

In a high-availability implementation employing two or more network interfaces 114, network load may be spread across the network interfaces 114 while each is active, thus improving network bandwidth and possibly improving overall system performance.

Blade server 110 may be implemented using commercially available products such as, for example, the Dell PowerEdge 1655MC. These products provide the hardware platform and provide some software management support to install operating systems and applications on individual blades 112.

Figure 2:
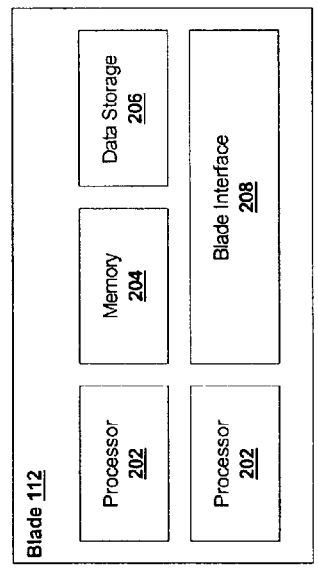
FIG. 2 is a block diagram of a blade that may be used in the blade server shown in FIG. 1.

Referring to FIG. 2, a blade 112 typically includes a computer system on a card that may be plugged into the blade server 110. The blade 112 includes one or more processors 202, memory 204, data storage 206, and a blade interface 208. The blade processors 202 may be implemented using any convention central processing units such as, for example, those made by Intel, AMD, or Transmeta. In one implementation, a blade server 110 includes 6 blades 112 and each blade 112 includes 2 Pentium III processors 202, 1 GB of memory 204, and a 100 GB harddrive for data storage 206. Many different blade interfaces 208 are available to couple the blade 112 with the blade server 110 including high-speed bus interfaces and high-speed networking technology (e.g., 1 gigabit Ethernet).

Each blade 112 in a blade server 110 may be used to provide a separate, independent computing environment in a compact footprint. In such an implementation, several services may be provided on a blade server 110 with each service running on a separate blade 112. This prevents a failure on one blade 112 from affecting an application providing a service on another blade 112.

In a monolithic server implementation, many services are provided by a large single server, with each service sharing the resources of the server to satisfy requests from clients. When each service is small and independent, it is typically easy to separate each service and port them to a blade server 110 architecture by distributing services across multiple blade 112, such as, for example, by running each service on a separate blade 112. This implementation may provide increased availability and performance.

Referring to FIG. 3, one or more services may be distributed across multiple blades. In this example, clients 102 send requests across a network to a blade server 110. The requests are routed to the appropriate blade 112 for the requested service. For example, a first blade 112 provides service A 302, another blade 112 provides service B 304, a third provides service C 306, and a fourth blade 112 provides service D 308. The services 302, 304, 306, and 308 may include any computer application, such as, for example, electronic mail, web services, a database, or firewall. In this example, the services 302, 304, 306, and 308 are each running on a separate blade 112. In some implementations, it may be desirable to run multiple services on a single blade 112.

The example described above with respect to FIG. 3 shows the use of blade server 110 providing different services that may have once been provided in a single monolithic architecture. The blade server 110 also may be used to support identical types of services that operate independently on individual blades 112. A web-hosting company may use a blade server 110 with each blade 112 providing web services for different customers. Each blade 112 is providing the same service; however, they are serving different data to possibly different clients 102.

Referring to FIG. 4, most applications employing blade server technology choose blade servers to take advantage of their rack density and their effectiveness in providing large numbers of manageable servers. Software management techniques for blade servers assist administrators in installing operating systems and software, and in configuring blades for a new application or new customer. The benefits of blade servers also may be used to distribute a service across multiple blades 112 as described herein below. FIG. 4 shows clients 102 coupled to a network 106 to send requests to the blade server 110. The blade server 110 includes multiple blades 112 running service A 402. This allows a single service to be distributed across multiple blades 112, utilizing resources from multiple blades 112 to satisfy client 102 requests.

For example, when an application is very resource-intensive, it may not be easy to directly port the application to a blade server 110 architecture because the application requires more resources than a single blade can provide. In such a case, it may be desirable to separate out a single service to multiple blades 112 as shown in FIG. 4.

Figure 5:
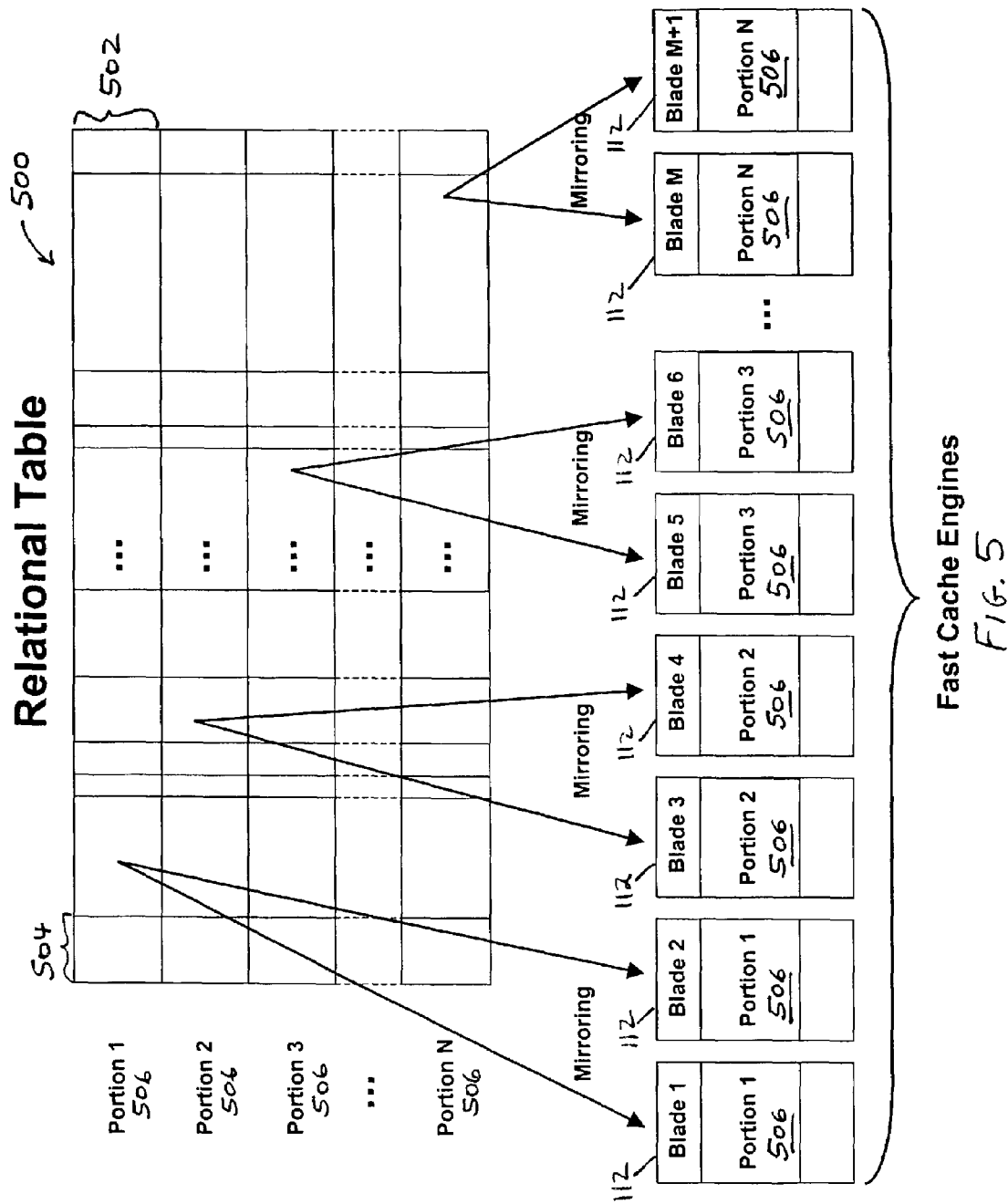
FIG. 5 is a diagram of a table from a relational database management system having data records divided into portions for distribution across multiple blades.

Referring to FIG. 5, some applications may realize increased performance by distributing the application across multiple blades. For example, a fast cache system may require large amounts of memory, data storage, and computational resources such as that described in the following applications: WO 02/061612 A2, titled "Data Structure for Information Systems" and published Aug. 8, 2002, and WO 02/061613, titled "Database System and Query Optimiser" and published Aug. 8, 2002, each of which is hereby incorporated by reference in its entirety for all purposes.

In some implementations, the fast cache system receives a table 500 from a relational database management system (RDBMS). The table 500 is loaded into the cache and structured to speed the execution of data queries. The fast cache system may require significant resources, perhaps even more than provided by a single blade 112. To improve performance, the fast cache system may be distributed across multiple blades 112 as discussed above with respect to FIG. 4 by dividing the RDBMS table 500, having rows 502 of data records and columns 504 of data attributes, into multiple portions 506 and loading each portion 506 into an instance of the fast cache system running on a blade 112. This is referred to as a horizontal distribution.

In addition to dividing the table 500 into portions 506 and distributing the portions 506 across multiple blades 112, the fast cache system also may mirror portions 506 to increase system availability. For example, FIG. 5 shows the first portion 506 mirrored to two separate blades 112. The separate instances of blades 112 containing the same data portions 506 provide redundancy in case of component failure. In addition, mirrored blades 112 may be used to distribute load across both blades 112 to increase system performance.

For example, if a fast cache system needs to load 50 million data records from a RDBMS table, the table may be broken into 5 portions 506 of 10 million data records each. Each portion 506 is loaded into a separate blade 112 such that when a query is received by the fast cache system, the query is applied to each of the portions 506 loaded into the 5 blades 112. The results from each blade 112 are then combined and returned to the requesting client 102 as will be described below with respect to FIG. 9. By dividing the table 500 into multiple portions 506, the fast cache system may be distributed across multiple blades 112. This technique may provide increased scalability and increased performance.

Figure 6:
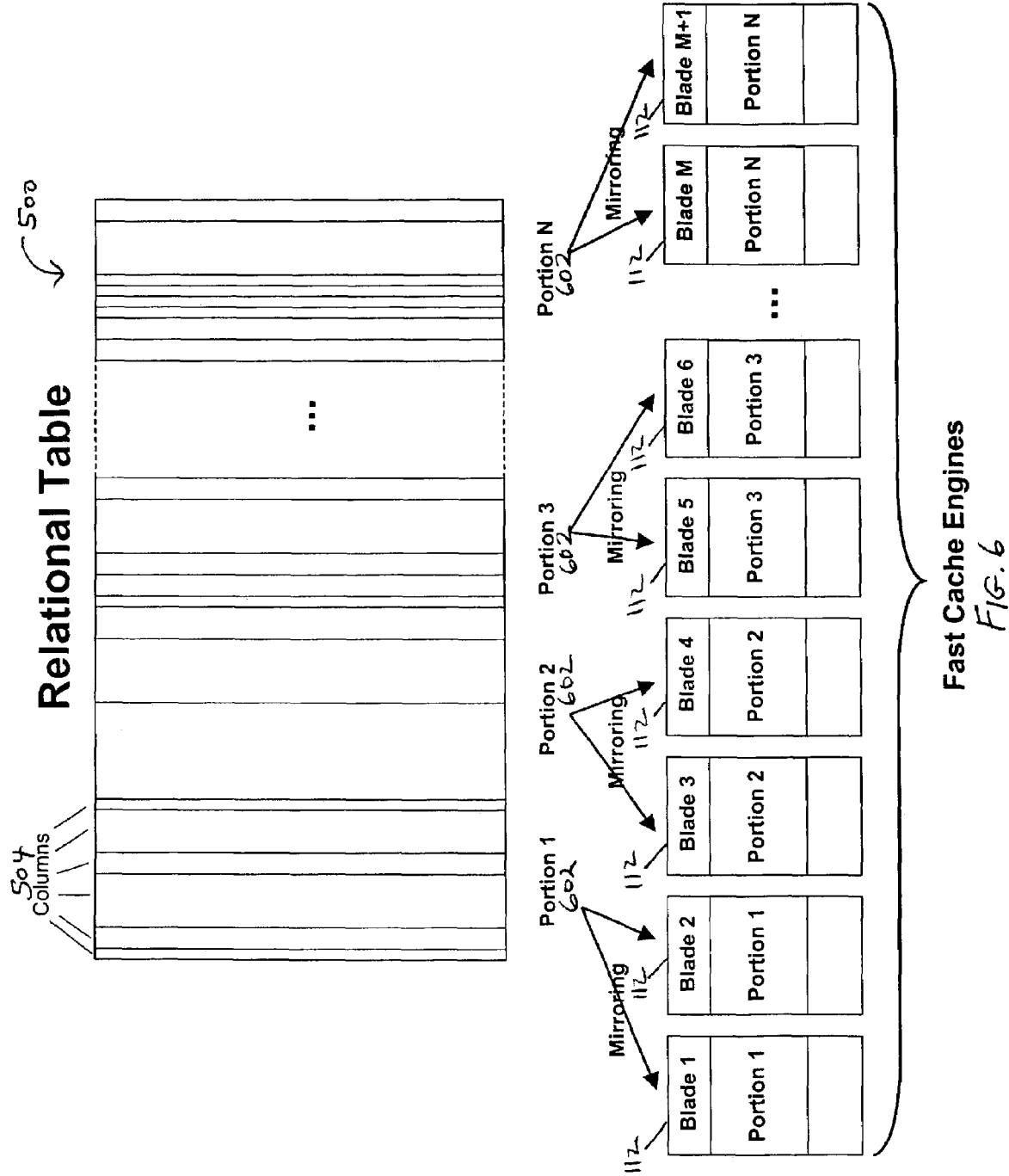
FIG. 6 is a diagram of a table from a relational database management system having data attributes divided into portions for distribution across multiple blades.

Referring to FIG. 6, the table 500 may be divided using a horizontal distribution as discussed above, or it may be divided into portions 602 including columns 504 of data attributes in a vertical distribution. For example, each data record may include the following data attributes: (1) first name; (2) last name; (3) birth date; and (4) customer number. The table 500 may be divided into portions 602 having one or more columns 504 of data attributes. In this example, the portions 602 may include any combinations of columns 504, such as, a first portion 602 with the first name and last name attributes, a second portion 602 with the birth date attribute, and a third portion 602 with the customer number attribute. The table 500 could similarly be divided into any other combinations of data attributes. In these implementations, queries may be sent to each instance of the fast cache system running on multiple blades 112 or may be sent to only the blades 112 including portions 602 of the table 500 relevant to the search.

Figure 7:
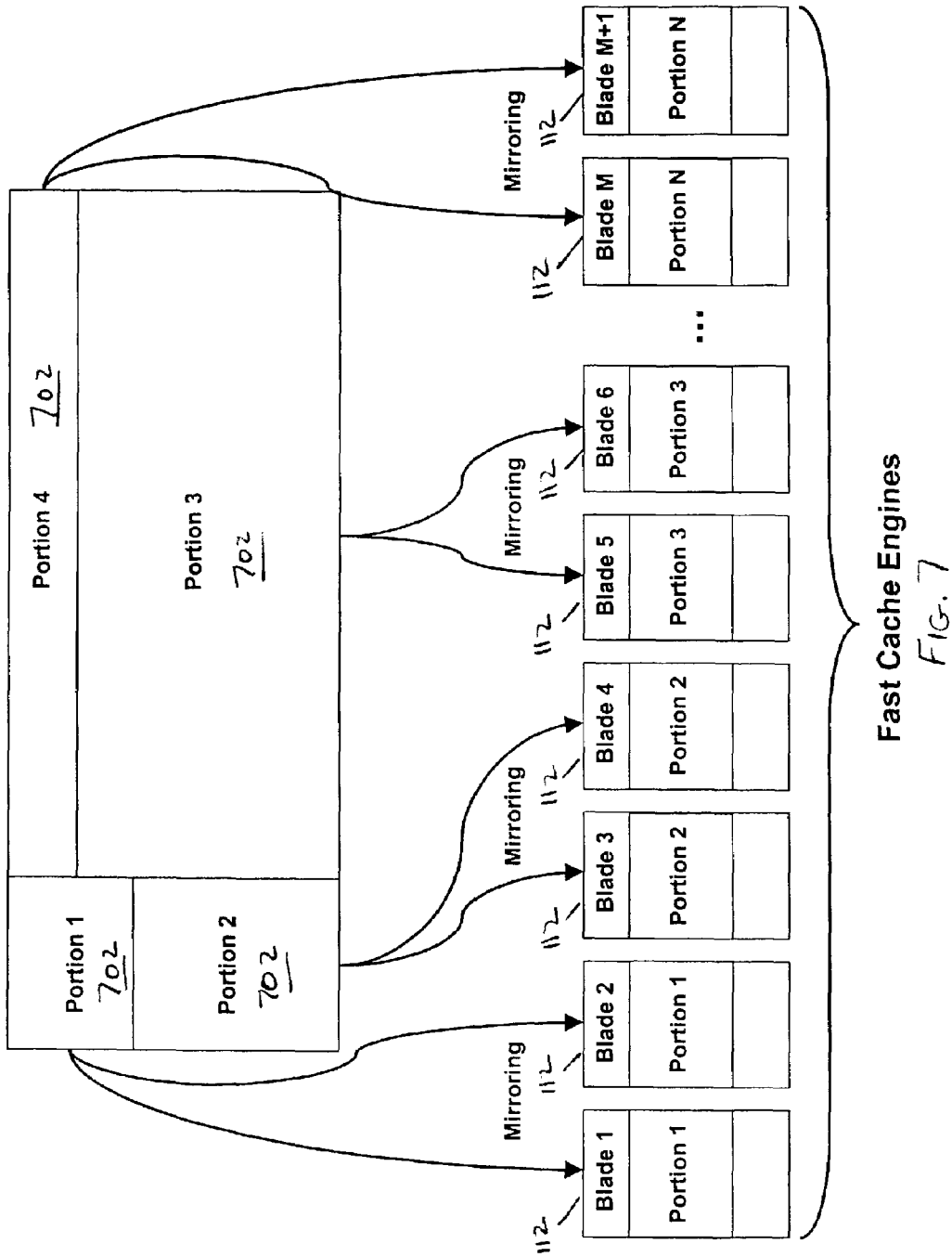
FIG. 7 is a diagram of a table from a relational database management system having sets of data attributes and data records divided into portions for distribution across multiple blades.

Referring to FIG. 7, in addition to horizontal and vertical distributions, the table 500 also may be divided into any other arbitrary portions 702, such as, for example, the four portions 702 shown. Each portion 702 may be loaded into instances of the fast query system on multiple blades 112. FIG. 7 illustrates the portions 702 being loaded into mirrored instances. FIGS. 5-7 illustrate various ways a large monolithic application may be divided and distributed across multiple blades. A system developer may choose to distribute the table 500 in any manner to increase system performance and/or improve availability.

Figure 8:
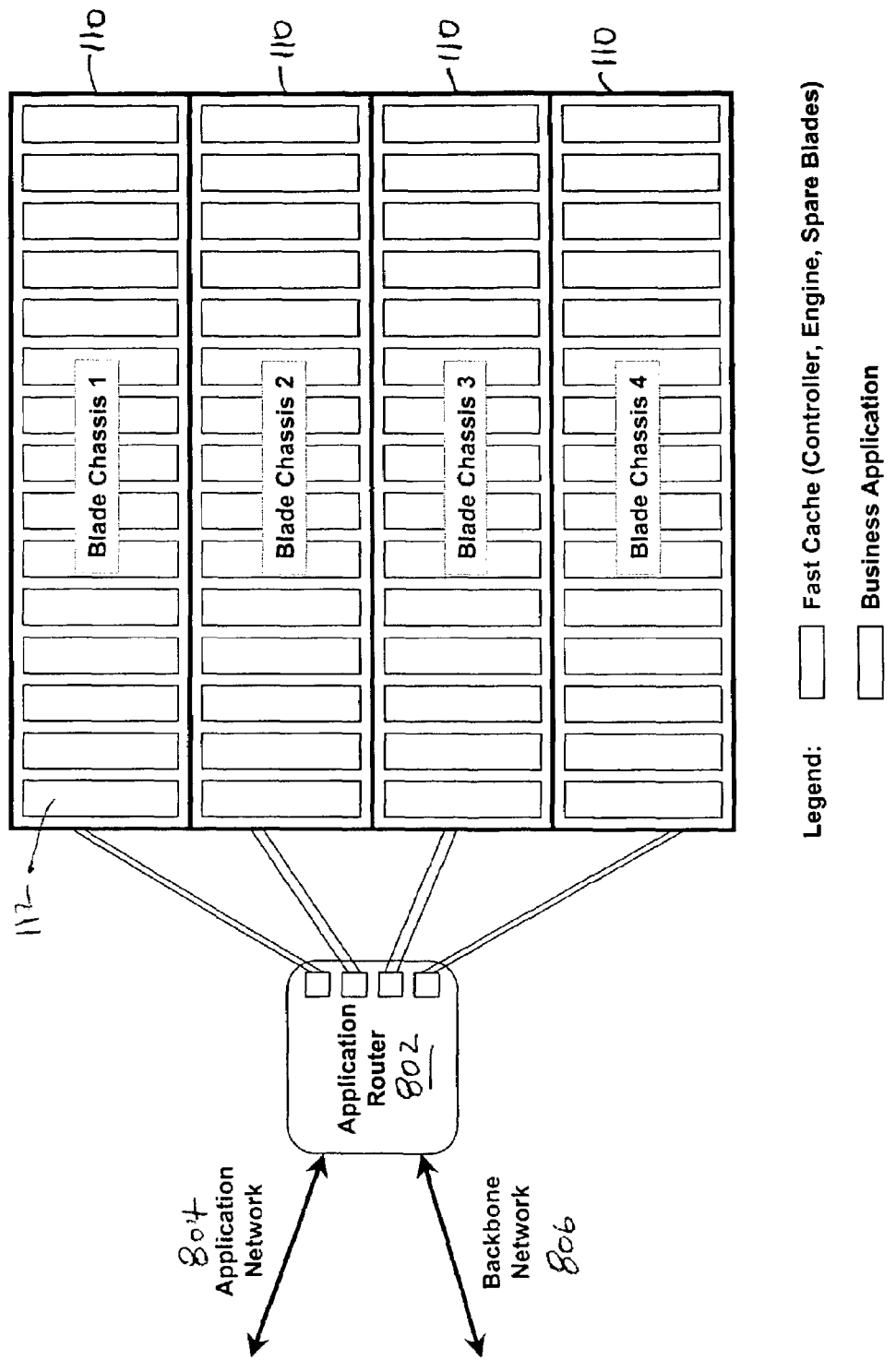
FIG. 8 is a block diagram of an application router used to distribute client requests to the appropriate blade or blades of one or more blade serves.

Referring to FIG. 8, the descriptions above discuss distributing data across multiple blades 112 in a single blade server 110. Applications also may be distributed across multiple blade servers 110 as shown in FIG. 8. To facilitate routing of requests, an application router 802 may be used. The application router 802 is coupled to one or more networks, such as, for example, an application network 804 and a backbone network 806. The application router 802 accepts requests from clients 102 across the application network 804 and from other applications across the backbone network 806. These requests are routed to the appropriate blade or blades 112 within one or more blade servers 110.

For example, a system may include a fast cache application, a database, and a customer relationship management system. So that the backend architecture may evolve, the application router 802 may be used to provide a level of indirection. If the location of the database is moved from one blade 112 to another blade 112 or from one set of blades 112 to another, then only the application router 802 needs to be updated. Clients 102 still send requests to the application router 802 which serves as a proxy for applications running on the blade servers 110.

Figure 9:
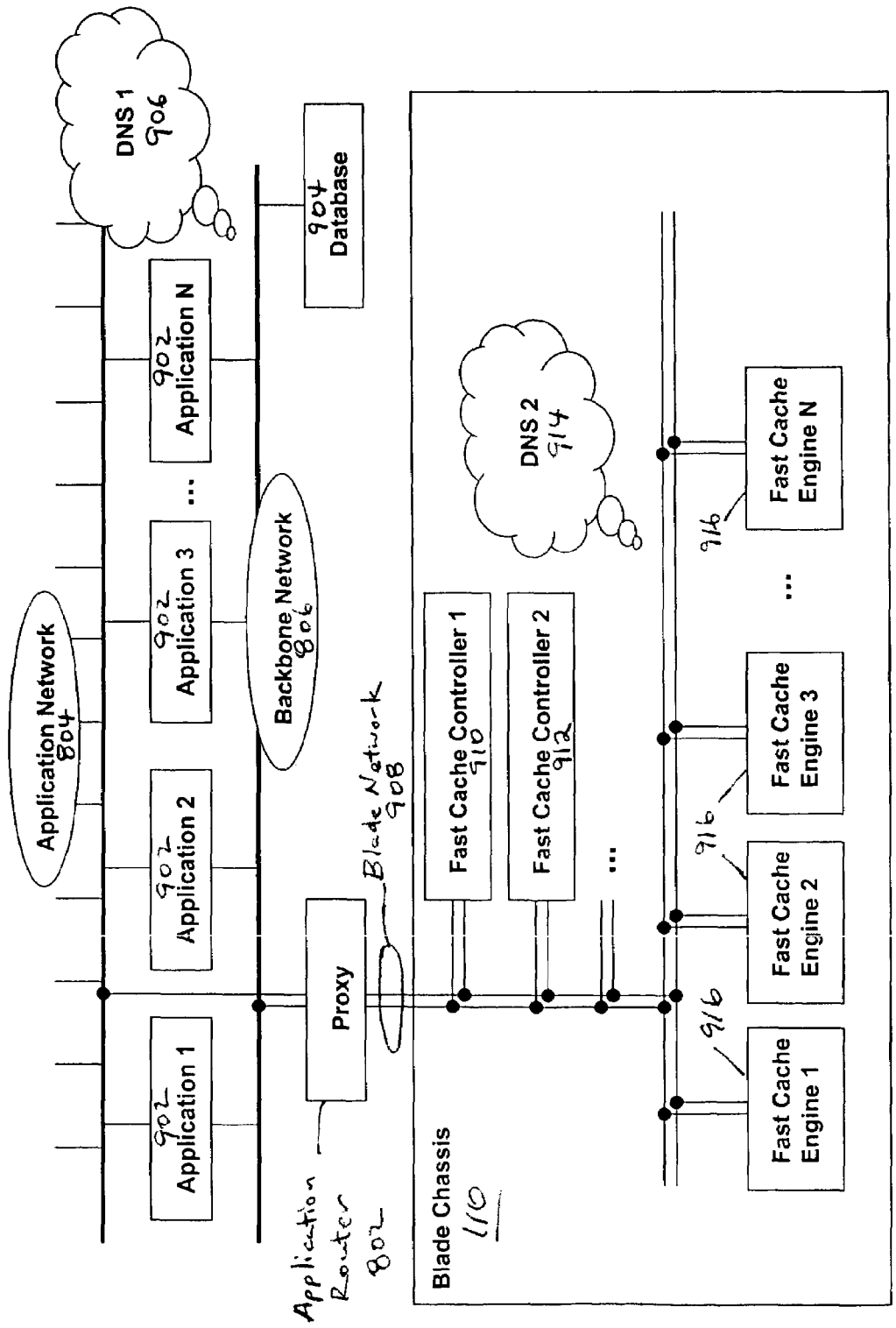
FIG. 9 is a network diagram of a fast cache query system distributed across multiple blades.

FIG. 9 shows a network diagram of one implementation of a fast cache system distributed across multiple blades 112. Clients 102 are coupled to the application network 804 through any conventional means. Using the application network 804, clients 102 may access one or more applications using the hostname of the applications 902 to submit requests. The hostnames are resolved to addresses (e.g., Internet protocol (IP) addresses) using a domain name service (DNS) 906. Applications 902 may access one another or a database 904 across a backbone network 806.

A fast cache system is distributed across blades 112 in a blade server 110. Clients 102 submit requests across the application network 804 to the application router 802 which serves a proxy for the fast cache system. The application router 802 sends requests across a blade network 908 to a fast cache controller 910 or 912 which submits a query to one or more fast cache engines 916. The fast cache engines 916 are instances of the fast cache query system running on the blades 112 of the blade server 110.

A second DNS 914 is used to resolve hostnames behind the application router 802. For example, the fast cache controller 910 may be given a host name and IP address that is stored in DNS 914, but not in DNS 906. This allows the configuration of the fast cache system to be hidden behind the application router 802.

The application router 802 is typically located outside of the blade 110 chassis and may be used to isolate the backbone network 806 from the blade network 908. By decoupling the backbone network 806 from the blade network 908, the networks may operate at different speeds and use different technologies or protocols and traffic on the backbone network 806 will not directly impact the performance of inter-blade communication in the blade network 908.

The blade network 908 serves as a fast interconnect between the blades 112 residing in the blade server 110. In this system, each blade 112 is equivalent from a hardware point of view; however, the software functionality of each blade 112 may be different. The majority of blades 112 are used as engines 916 to perform application tasks, such as, for example, selections, inserts, updates, deletions, calculations, counting results, etc. Each engine 916 owns and manages a portion of data as described above with respect to FIGS. 5-7.

The cache controllers 910 and 912 oversee the operation of the fast cache system performing tasks such as, for example, monitoring client connectivity, receiving calls from clients and/or applications and distributing the class to the appropriate engines 916, collecting results from the engines 916, combining the results from different engines 916 to determine a response to a query, and sending the response to the requesting entity.

The system architecture described in FIG. 9 is applicable to some implementations of blade servers 110. Additional commercial implementations of blade servers 110 may provide different internal architectures with varying numbers of blades 112 and network designs. One skilled in the art will understand how to use the techniques herein described with any blade server 110 design.

The hardware architecture is described above for distributing an application across multiple blades 112 in one or more blade servers 110. A description of the logical and software design of such an architecture follows.

Figure 10:
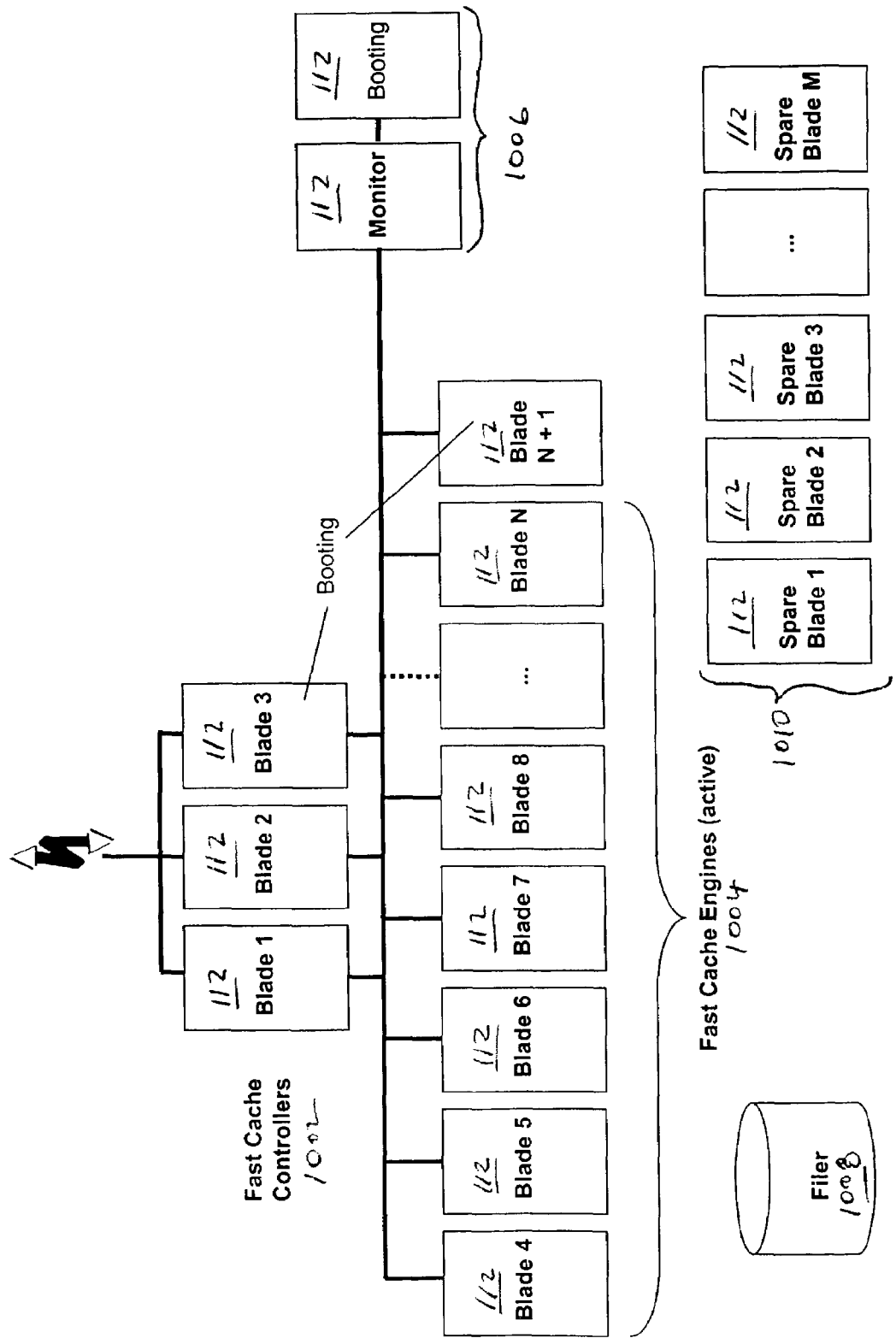
FIG. 10 is a block diagram of the logical relationships between blades in an application distributed across multiple blades.

Referring to FIG. 10, a fast cache system is deployed on one or more blade servers 110 having a total of N blades 112. When a new blade 112 is added to the system, the operating system and software may be installed on the blade 112 such that the blade 112 may be used in the distributed fast cache implementation. The software images may be stored in the filer data store 1008. Once the software image is installed on a blade 112, the system may start services, run scripts, install and configure software, copy data, or perform any other tasks needed to initialize or clone the blade 112.

The blades 112 serve at least two major functions: as a controller 1002 or as an engine 1004. The controllers 1002 receive requests from clients and coordinate the requested action with the engines 1004. In addition, a monitor 1006 may be executed on a blade 112 to assist the controller 1002 in detecting performance problems, component failures, software failures, or other event. The monitor 1006 functionality instead may be included in the controllers 1002 or engines 1004 or distributed between the controller 1002, engine 1004, and/or monitor 1006.

To reduce the likelihood of system outage due to the failure of the controller 1002, redundant controllers 1002 may be provided. In the implementation shown in FIG. 10, two controllers 1002 are provided, with a third in a "booting" state (described further below). In some implementations, a serves as a primary controller 1002, coordinating all requests and controlling all engines 1006. In other implementations, multiple controllers 1002 are simultaneously used with each controller 1002 corresponding to a portion of the engines 1004.

For each of the blade 112 categories (i.e., controllers 1002, engines 1004, and optionally monitors 1006), the system attempts to maintain an extra blade 112 in the booting state so that it may be quickly used if a failure is detected or to periodically reboot processes running on any of the blades. FIG. 10 shows a controller 1002 in the booting state, an engine 1004 in the booting state, and a monitor 1006 in the booting state 1006. In addition, a number of spare blades 1010 may be maintained to be used as needed.

In this implementation, a blade 112 may be configured in cold reserve, warm reserve, or hot reserve. In cold reserve state, the blades 112 is loaded with an operating system and software and then either placed in a low power state, turned off, or otherwise temporarily deactivated.

In the warm reserve state, the blade 112 is powered on and the operating system is booted and ready for use; however, the application software is not started. A blade 112 in the warm state may be activated by setting the appropriate configuration, providing any necessary data, and starting the application software.

In the hot reserve state, the blade 112 is up and running as in the warm reserve state; however, a hot reserve blade 112 also runs the application software. Though a hot reserve blade 112 has application software running, the blade 112 is still in reserve and does not actively participate in the productive operation of the system. In many cases, a blade 112 may be in hot reserve for only a short time as a blade 112 transitions from a cold or warm state to an active state.

In the system shown in FIG. 10, spare blades 1010 may be kept in warm reserve until they are needed and booting blades may be kept in a hot reserve state so that they may be quickly placed in active service.

Figure 11:
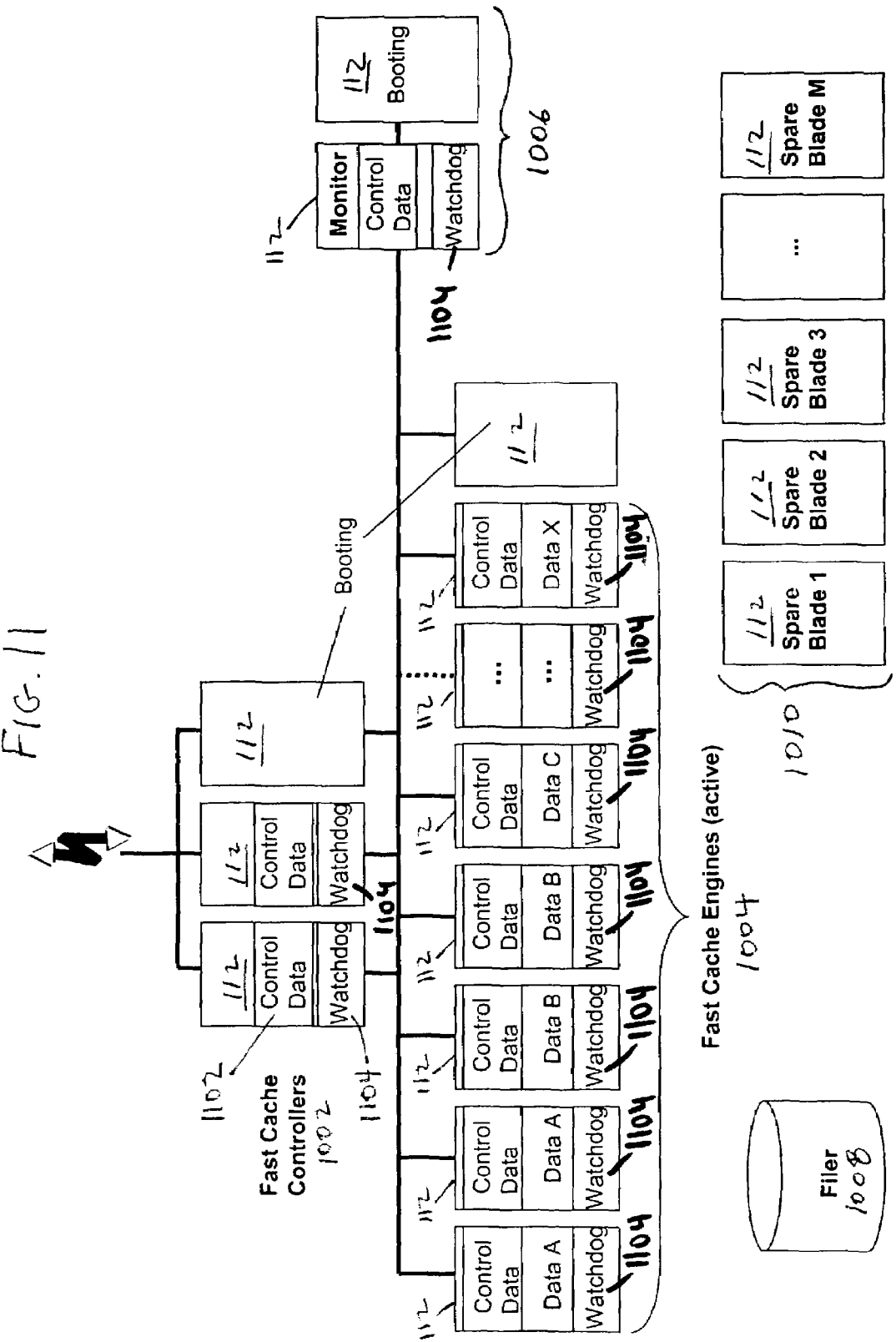
FIG. 11 is a block diagram of an application distributed across multiple blades using a watchdog process to detect errors, bottlenecks, or other faults.

Referring to FIG. 11, the fast cache system may be distributed across multiple blades 112 as described herein. The system may provide redundancy in the controllers 1002 by maintaining at least two active controllers 1002 at all times. This allows the system to remain active and functioning even if a single controller 1002 fails. In addition, the system may provide redundancy in the engines 1004 by mirroring data. Instead of keeping a single copy of data portions from horizontal, vertical, or arbitrary distributions (described above with respect to FIGS. 5-7), the system may mirror the data, storing the identical data on multiple blades 112. This may facilitate redundancy, load balancing, and/or availability. When mirrored engines 1004 are used, there is no need to run queries on both mirrored copies, duplicating effort; however, when data updates occur each mirror must be updated appropriately so that the mirrors maintain the same data.

Sometimes, a progression of internal state changes may lead software to fail due to some software bug. If two mirrored copies maintained exactly the same state, then a software bug causing failure would likewise cause failure in each mirror. To prevent this, it is useful that mirrored engines 1004 not maintain exactly the same state, only the same data.

In the fast cache implementation, engines 1004 maintain various internal counters, variables, parameters, result sets, memory layouts, etc. To avoid identical occurrences of internal variables, a series of read requests may be distributed between equivalent engines 1004 through any load balancing techniques. For example, a round-robin technique may be employed to alternate requests through each available engine 1004 or requests may be sent to the first idle engine 1004.

As shown in FIG. 11, the cache controllers 1002 are responsible for distributing requests to the appropriate engines 1004. Thus, the controllers 1002 need to know information, such as, for example, what engines 1004 are available and what data is loaded into each engine 1004. The cache controllers 1002 maintain control data 1102 that includes information needed to perform the tasks of the controller 1002. This control data 1102 may be distributed to each blade 112 as shown in FIG. 11. That way if each controller 1002 failed, a new controller can be started on any active blade 112 or a new blade 112 may obtain the needed control data 1102 from any other blade 112.

When the monitor 1006 determines that an engine 1004 is not operable or a bottleneck situation is occurring, the monitor 1006 informs the controllers 1002 of any changes in the blade landscape. The controllers 1002 then update the new control data 1102 in each of the engines 1004.

As shown in FIG. 11, each blade 112 also may include a watchdog process 1104 to actively monitor and detect software and/or hardware failures in any of the active blades 112. The watchdog processes 1104 supervise each other and report on the status of the fast cache system to the monitor 1006.

Figure 12:
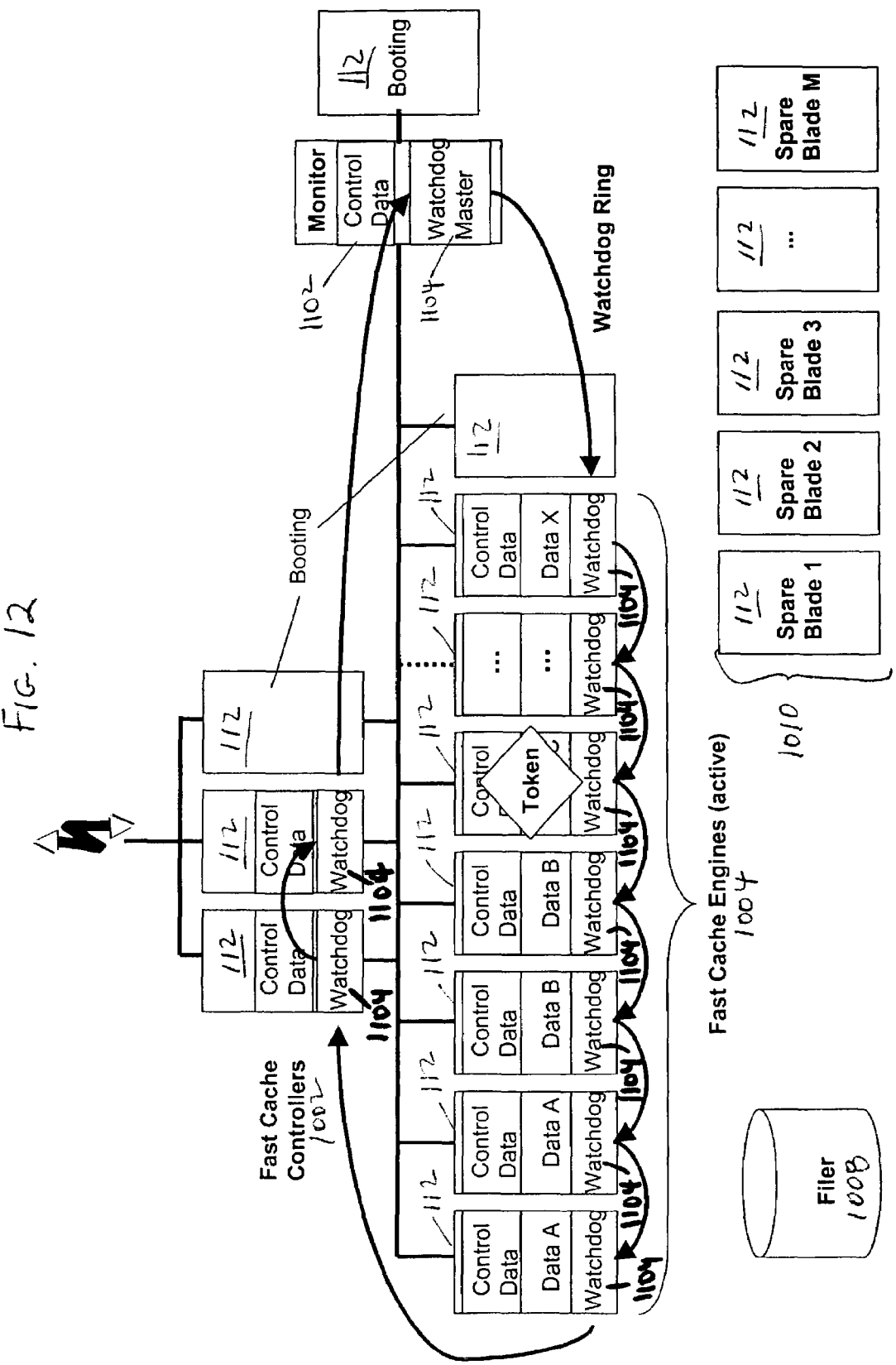
FIG. 12 is a block diagram of a token ring process for monitoring system functionality using watchdog processes.

Referring to FIG. 12, the watchdog processes 1104 actively report on their status so that failures may be detected. For example, if th operating system of a blade 112 freezes, the system may appear to be operational from a hardware perspective; however, the system may be unable to satisfy requests. If a watchdog process 1104 fails to report on status in a timely fashion, then the monitor 1006 may assume that the blade 112 is down and update the blade landscape accordingly. To prevent all watchdog process 1104 from simultaneously sending update information, a token ring technique may be used.

In this implementation, the watchdog processes 1104 are configured in a logical ring structure. The ring reflects the order in which the watchdog processes 1104 are allowed to submit status information. In this manner, only one watchdog processes 1104 may submit status information at a given time. The ring may be traversed in a clockwise or counterclockwise manner. One watchdog process 1104 serves as a master watchdog process 1104 to receive status information. By default, the monitor 1006 watchdog process 1104 is chosen as the master; however, any other watchdog process 1104 could also serve this purpose. The ring is traversed by passing a token from one watchdog process 1104 to the next. When a watchdog process 1104 receives the token, the watchdog process 1104 submits status information to the master watchdog process 1104. The master then sends an acknowledgment to the submitting watchdog process 1104. When the watchdog process 1104 receives the acknowledgment, the token is passed to the next watchdog process 1104 in the ring. In this implementation, status exchange is symmetrical; the master sends its status information to each other watchdog process 1104 and likewise receives status information from each watchdog process 1104. Timeouts are used to detect hung, slow, or otherwise failed processes.

The watchdog process 1104 having the token may detect problems with the master watchdog process 1104 if an acknowledgement of status information is not received. When the master watchdog process 1104 dies, the watchdog process 1104 with the token may detect the problem and initiate a procedure to replace the master watchdog process 1104. For example, the watchdog process 1104 detecting the failure may take over as the watchdog process 1104 or another process may (e.g., the watchdog process 1104 running on another monitor 1006) be promoted to the master watchdog process 1104. When a new master watchdog process 1104 is operational, the token is passed and the status reporting continues.

In some implementations, the master watchdog process 1104 serves in place of the token. The master watchdog process 1104 calls one watchdog process 1104 after another in a predefined order. Upon being called, each watchdog process 1104 submits status information to the master. After successful receipt of status information, the master watchdog process 1104 continues to the next watchdog process 1104. This process may be repeated periodically to identify hung, slow, or otherwise failed blades 112.

In any software application, there is a possibility of bugs in application software or in the operating system that can degrade system performance over time, possibly resulting in system outage. For example, a software application may include some bug that makes the process unstable as it ages, such as a memory leak where some memory is not released after it is no longer needed. With such a design error, there may be no logical errors that would cause improper behavior in the application; however, over time the system will exhaust all available resources as memory is slowly drained. Additionally, failures and instabilities may occur due to counter overflows. It is desirable to periodically restart processes to protect against bugs such as memory leaks.

Additionally, some processes reread some configuration information or rebuild internal data structures when restarted. To update the process, a periodic restart may be required. When a process restarts, the process is brought down temporarily and restarted, thus causing some temporary service outage. It is desirable to provide a mechanism to restart processes while minimizing or preventing any downtime.

Figure 13:
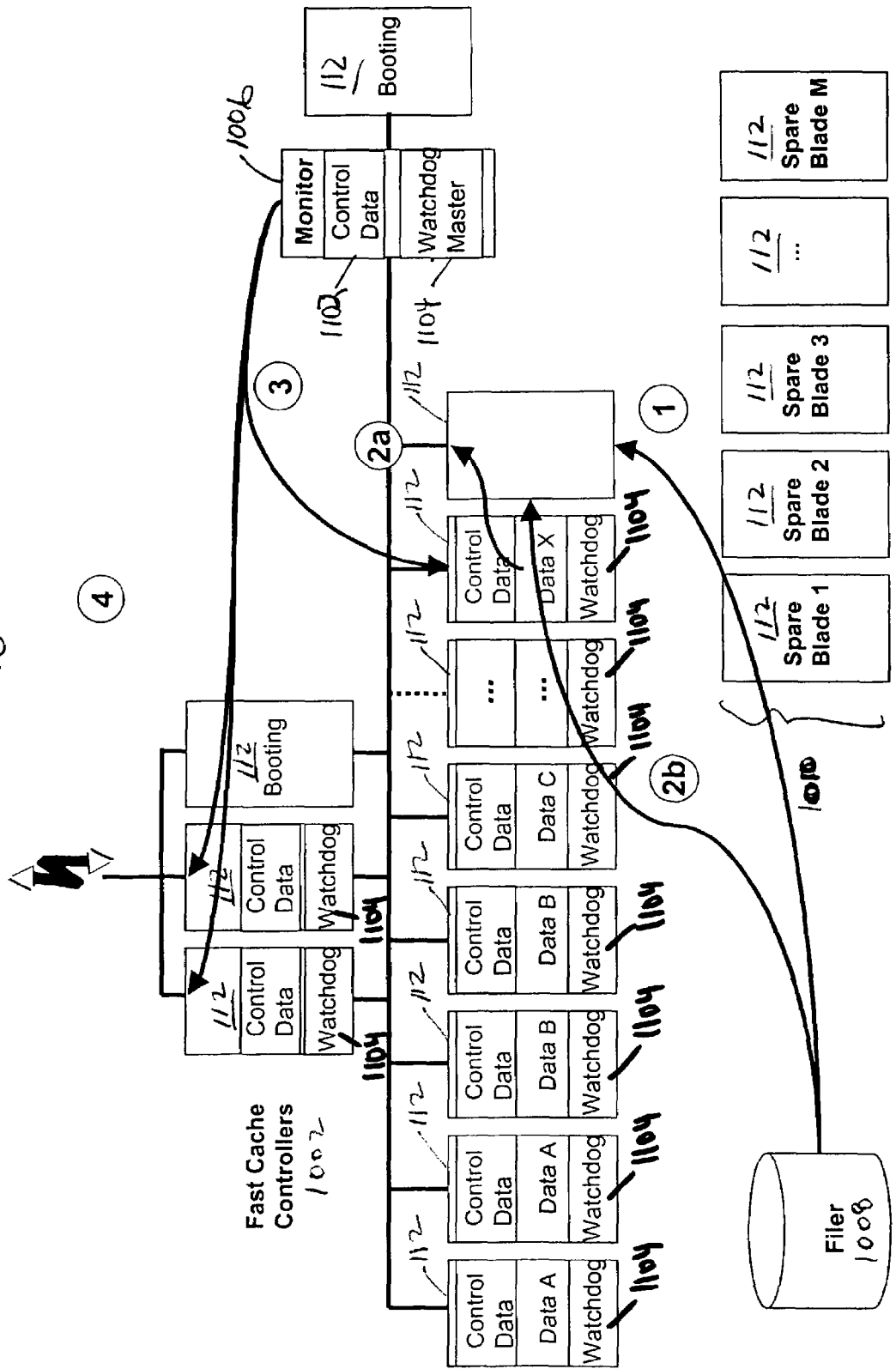
FIG. 13 is diagram of a rolling restart in an application distributed across multiple blades.

Referring to FIG. 13, an engine 1004 may be restarted on a new blade 112 by starting up the appropriate software on the new blade 112, copying the process context information from the running engine 1004 onto the new blade 112, updating the control data 1102 to activate the new blade 112, and terminating the engine 1004 running on the old blade 112.

In greater detail, an engine 1004 is restarted by preparing a new blade 112 to take over for the existing engine 1004. For example, a booting blade 112 may be used that already has been imaged with the necessary software copies from the filer 1008. If a hot reserve blade 112 is unavailable, a warm or cold reserve blade may be prepared by copying the needed software from the filer 1008 and starting any needed processes.

Next, the new blade 112 needs the appropriate process context information to operate in place of the old blade 112. The process context includes various data and state information needed for the new engine 1004 to take the place of the old engine 1004. For example, the new blade 112 needs the data portion of the table 500 stored in the old engine 112 as well as the control data 1102 from the old engine 1004.

In this implementation, there are two types of data that make up the process context information of an engine 1004: non-client data and client data. Non-client data includes process context information obtained from other sources, such as, for example, control data 1102. The non-client data is not changed directly by the client and may be directly copied to the new blade 112. Client data is data that may be modified by the old engine 1004 such as portions of the table 500 stored in the engine 1004. This data must be fully copied before any changes occur. Any conventional transactional database techniques may be used to facilitate data copying. For example, a checkpoint of the data structures used by the old engine 1004 may be made to the filer 1006. The checkpointed data may then be immediately loaded into the new blade 112.

When the appropriate process context information has been loaded, the monitor 1006 informs the controllers 1002 that the new engine 1004 is available and terminates the old processes. The old blade 112 may then be initialized as a booting blade 112. The example shown above applies to engine 1004 processes; however, the same technique may be used to restart any other process including controllers 1002 or monitors 1006. This technique allows a process to be restarted before the old process is terminated, thus preventing any downtime.

Because regularly restarting processes may increase system stability, some implementations periodically restart each controller 1002, each engine 1004, and each monitor 1006.

Figure 14:
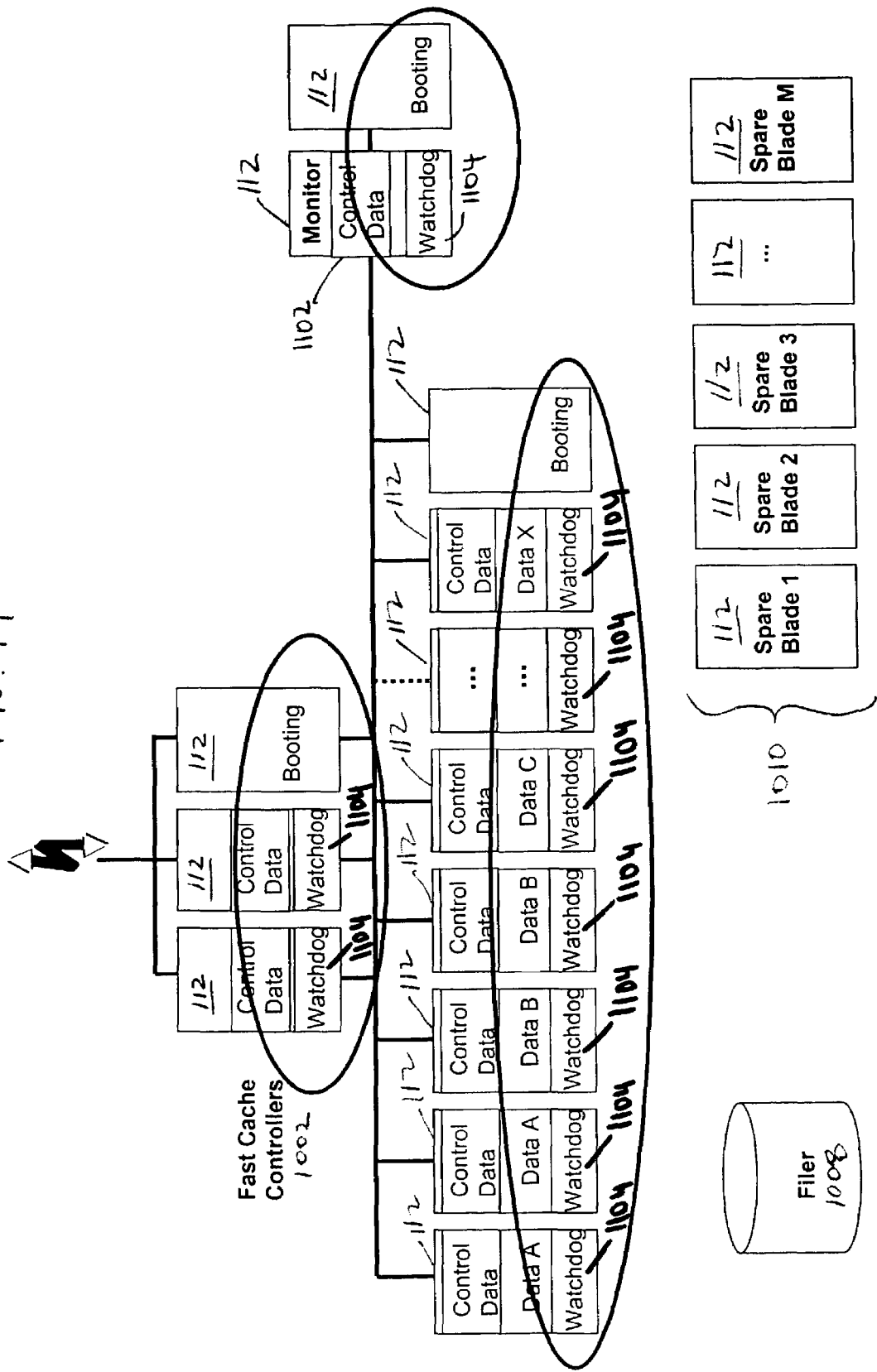
FIG. 14 is a diagram of a system using multiple booting blades to periodically restart multiple blade classes.

FIG. 14 shows the use of three booting blades 112 that are used to cycle through the available controllers 1002, engines 1004, and monitors 1006.

Referring to FIG. 15, if fewer than three spare blades 1010 are available, then a single booting blade 112 may be shared by the controllers 1002, engines 1004, and monitors 1006. The booting blade 112 also serves as a spare in case of an outage or other event necessitating replacement.

A number of implementations have been described. Nevertheless, it will be understood that various modifications may be made without departing from the spirit and scope of the disclosure. Accordingly, other implementations are within the scope of the following claims.

What is claimed is:

1. A method for restarting a first process running on a first processor as a second process running on a second processor, the method comprising:
    preparing the second processor by copying process context information from the first processor to the second processor, the process context information comprising database records, wherein the first processor is associated with a first blade in a first blade server and the second processor is associated with a second blade in a second blade server;
    running the second process on the second processor using the context information;
    running a monitor process on a third processor for detecting events, the events including whether or not a processor is available;
    terminating, by the monitor process, the first process running on the first processor while the second process is running, wherein the monitor process terminates the first process periodically;
    informing, by the monitor process, at least one controller that the second process is available and the first process is not available; and
    receiving a client request at the at least one controller, and forwarding the client request to the second processor instead of the first processor such that the second process performs an equivalent function to the first process,
    wherein the second process responds to the client request by returning the database records,
    wherein the at least one controller comprises data indicating the availability of the first and second processors and control data loaded in the first and second processors, and
    wherein the first processor, second processor, third processor and the controller comprise the same control data.

2. The method of claim 1 wherein preparing the second processor includes:
    installing an operating system; and
    installing application software.

3. The method of claim 2 wherein preparing the second processor further includes configuring the operating system and the application software.

4. The method of claim 1 wherein preparing the second processor includes activating a cold reserve spare processor.

5. The method of claim 1 wherein copying process context information to the second processor includes copying the control data to the second processor.

6. The method of claim 1 wherein copying process context information to the second processor includes copying process data.

7. The method of claim 6 wherein the process data includes dynamic data and wherein copying the dynamic data includes:
    creating a checkpoint of the dynamic data; and
    copying the checkpoint to the second processor.

8. The method of claim 1 wherein the process provides one or more functions in a distributed fast cache system.

9. The method of claim 1 wherein the process provides one or more functions in a distributed data store system.

10. A blade system comprising:
    a first blade executing a first process providing a service;
    a second blade executing a second process using context information copied from the first process, the context information comprising database records;
    a third blade executing a monitor process for detecting events, the events including whether or not a blade is available, wherein the monitor process terminates a process running on the first blade while the second process is running, wherein the monitor process terminates the process running on the first blade periodically;
    a controller comprising data indicating an availability of the first and second blades and control data loaded in the first and second blades,
    wherein the blade system receives a client request at the at least one controller, and forwards the client request to the second blade instead of the first blade so that the service is available while the first process is restarted,
    wherein the second process responds to the client request by returning the database records,
    wherein the first blade, second blade, third blade and the controller comprise the same control data, and
    wherein the first blade and the second blade are on different blade servers.

11. The blade system of claim 10 wherein the controller manages multiple processes.

12. The blade system of claim 10 wherein the first process is restarted by starting the second process to provide the service and configuring the controller to forward the client request to the second process if the client request is for the service.

* * * * *